United States Patent
Kuriyan

(10) Patent No.: US 7,266,094 B2
(45) Date of Patent: *Sep. 4, 2007

(54) WIRELESS DATA INTERFACE SYSTEM FOR FIXED POINT-TO-POINT COMMUNICATIONS

(75) Inventor: George Kuriyan, Bridgewater, NJ (US)

(73) Assignee: MCI Communications Corporation, Washington, DC (US)

( * ) Notice: Subject to any disclaimer, the term of this patent is extended or adjusted under 35 U.S.C. 154(b) by 576 days.

This patent is subject to a terminal disclaimer.

(21) Appl. No.: 10/652,208

(22) Filed: Sep. 2, 2003

(65) Prior Publication Data

US 2005/0074056 A1    Apr. 7, 2005

Related U.S. Application Data

(63) Continuation of application No. 08/946,745, filed on Oct. 9, 1997, now Pat. No. 6,678,255.

(51) Int. Cl.
*H04B 7/00* (2006.01)

(52) U.S. Cl. .................. 370/310; 370/349; 375/222

(58) Field of Classification Search ............. 370/310, 370/349, 261, 252, 341, 338; 375/222, 223; 455/557, 403, 466; 379/93.01, 40; 380/24
See application file for complete search history.

(56) References Cited

U.S. PATENT DOCUMENTS

| 5,132,968 | A |   | 7/1992  | Cephus         |        |
|-----------|---|---|---------|----------------|--------|
| 5,282,204 | A |   | 1/1994  | Shpancer et al.|        |
| 5,454,024 | A | * | 9/1995  | Lebowitz       | 379/40 |
| 5,687,194 | A |   | 11/1997 | Paneth et al.  |        |
| 5,870,722 | A |   | 2/1999  | Albert et al.  |        |
| 5,991,410 | A |   | 11/1999 | Albert et al.  |        |
| 6,150,955 | A |   | 11/2000 | Tracy et al.   |        |
| 6,151,355 | A |   | 11/2000 | Vallee et al.  |        |
| 6,188,669 | B1|   | 2/2001  | Bellenger      |        |

* cited by examiner

*Primary Examiner*—Chi Pham
*Assistant Examiner*—Alexander O. Boakye

(57) ABSTRACT

A system for transmitting process control information from remote sites is disclosed. In one embodiment, data is collected by a remote monitoring device or devices and transmitted to a first Cellular Digital Packet ("CDPD") modem via one or more RS232 interfaces. The applications program in the first CDPD modem transmits a signal to a second CDPD modem initiating communications. The applications program in the second CDPD modem returns a signal, indicating the status of the interface. Data transmission is initiated when the status of both serial data interfaces is established.

38 Claims, 17 Drawing Sheets

WIRELESS DATA INTERFACE SYSTEM FOR FIXED POINT-TO-POINT COMMUNICATIONS

RELATED APPLICATIONS

The present application is a continuation of U.S. patent application Ser. No. 08/946,745 filed on Oct. 9, 1997 now U.S. Pat. No. 6,678,255, entitled "Wireless Data Interface System for fixed Point-to-Point Communications."

TECHNICAL FIELD

The present invention relates generally to a communications system and, more specifically, to an apparatus and method for implementing a communications interface protocol using existing Cellular Digital Packet Data ("CDPD") transmission equipment to implement point-to-point communications. More specifically, the invention relates to an apparatus and method of monitoring data collected by instrumentation such as temperature, pressure and flow meters located at sites remote from the process control computer, display or programmable logic controller to which the information is to be transmitted.

BACKGROUND

Collecting and monitoring data from a variety of locations for input into a central processing unit is a required function in a wide variety of applications. For example, in a chemical processing plant, such as a refinery, a variety of process parameters such as temperatures, pressures and flows are continuously or intermittently monitored and recorded. Similarly, in oil and gas production parameters such as pressures, flows and valve positions are measured and monitored. Likewise, certain types of environmental Typically, these parameters are measured at different locations in the particular process, and in some cases the instrumentation may be located at a remote site. Measurements are normally collected by the instrumentation as analog signal that is converted to a digital format and subsequently transmitted to a computing device such as a programmable process controller or process control computer via dedicated hard wired serial data interfaces. However, in is the case where the instrumentation is located at a remote site, it may be difficult or cost prohibitive to provide the direct hard wired connection between the serial data interface at the particular instrument's location and the interface at the particular computing device. On the other hand, wireless transmission of digital data over long distances has heretofore proven unreliable.

Cellular Digital Packet Data ("CDPD") is a wireless communications protocol that folds streams of data into envelopes or packets that are transmitted at very high speeds during pauses in cellular phone conversations. This permits the use of existing cellular systems as a means of data transmission. CDPD allows data files to be assembled into packets and transmitted via idle channels of existing, but CDPD-upgraded, cellular voice networks. CDPD allows the transmission of data at 19.2 Kbps over an enhanced cellular network. Adding CDPD to an existing analog cellular system allows cellular systems to transmit data eight times faster without the necessity of creating a completely new digital system.

In practice, packet data is transmitted in a wireless mode using bandwidth of the Advanced Mobile Phone Service ("AMPS") which operates as the communications infrastructure for analog cellular radio. Digital cellular is referred to as D-AMPS. CDPD specifications are published through the CDPD Forum and follow OSI (Open Systems Interconnection Protocol) guidelines. CDPD technology provides connectivity up to the network layer and is an overlay system that operates on AMPS frequencies.

The RS232 serial interface provides a serial data connection between two devices over dedicated wires. The interface defines up to 26 lines between two devices. One line carries the data and the others carry signaling information. Signaling is achieved by the lines through binary states, either "ON" or "OFF." Some lines are defined for data and some for signaling. Thus, data transmission can be controlled simultaneous by both the sending device and the receiving device.

For example, the sending device can query the receiving device as to whether it is ready to receive data by setting the signal high on a line called Ready To Send ("RTS"). The receiving device can, in turn, reply that it is ready to receive data by setting the signal high on the Clear To Send ("CTS") line. After these conditions are satisfied, by devices can begin data transmission over the data lines a communication speeds.

SUMMARY OF THE INVENTION

The present invention provides a system for point-to-point communication of digital data between devices utilizing RS232 interfaces. In one embodiment, process data, such as temperatures, pressures and flows are monitored at remote locations. The data is converted from an analog signal to a digital format and transmitted to a wireless modem via an RS232 serial data interface associated with the particular instrumentation. The data is then transmitted from the first wireless modem to a second wireless modem. The second wireless modem communicates the information to a device such as a process control computer or programable logic controller.

Wired RS232 applications conduct data communications between a sender and a receiver that are hard wired together. In a wired RS232 connection based application, several lines may simultaneously used to send signaling information; the signals on each line are detected by the sender and receiver instantaneously. On the other hand, in wireless RS232 communications, instantaneous communication does not occur. Rather, information is transmitted with a delay of ranging from 0.5 to 4 or 5 seconds. Furthermore, in wireless communications, modems can connect to a large number of devices using the call establishment methodology programmed into the modems.

The present invention provides a method and apparatus for using wireless modems for point-to point transmission of serial data in an RS232 mode, that provide (1) logic establishing the sender and receiver and (2) a signaling and data transmission methodology that makes the wireless mode transparent to the applications. The method and apparatus of the present invention allows utilization of wired RS232 based applications transparently on wireless communication systems, and alleviates the delay inherent in wireless communications without impacting the reliability of the system.

The invention provides a wireless point-to-point communications system for reliable and efficient digital data transfers as compared to prior art network interface protocols. In this regard, and in accordance with one embodiment, the invention utilizes a commonly available communications protocol, such as RS232, or other accepted serial standard to encapsulate digital data derived from an instrument, data collector, or other signal acquisition means in a wireless signal carrier. The serial protocol has built-in error correction and flow control. The end-to-end interface is compatible with ordinary devices supporting the protocol. In addition, the cellular communications infrastructure provides a reliable backbone with call switching and routing of the data to its intended destination. The RS232 data and flow control signals are encapsulated in a CDPD carrier supported in existing cellular infrastructure. Since RS232 is widely accepted and supported by a plurality of data acquisition and processing systems, the interface protocol provided is reliable and efficient.

The present invention is particularly adaptable to systems incorporating remote data collection devices such as process control systems, environmental monitoring systems, pipeline monitoring systems.

DETAILED DESCRIPTION

Figure 1A:
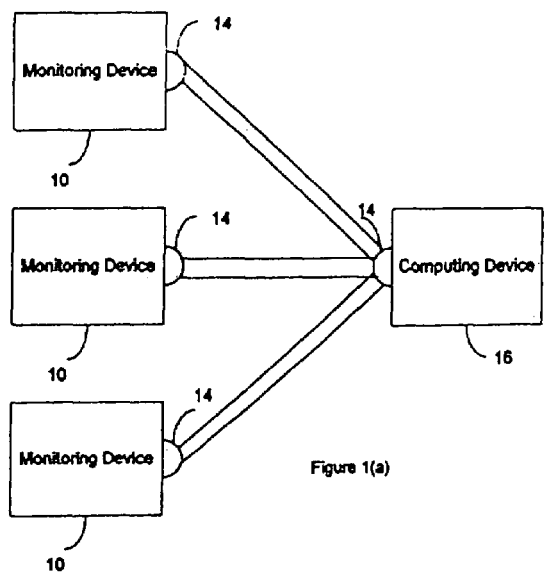
FIG. 1(a) is a schematic illustration of a monitoring system utilizing standard, wired RS232 data transmission.

Referring now to FIG. 1(a), a system utilizing standard RS232 data transmission is illustrated. In the illustrated embodiment, monitoring devices 10, measure process parameters such as temperatures, pressures and flows. The information is normally collected by meters such as a temperature, pressure, or flow meter which typically output an analog signal that are converted to a digital format and subsequently transmitted via wired RS232 interfaces to 14 to a computing device 16 such as a computer, programmable logic controller or data concentrators/multiplexers for storage and processing.

Figure 1B:
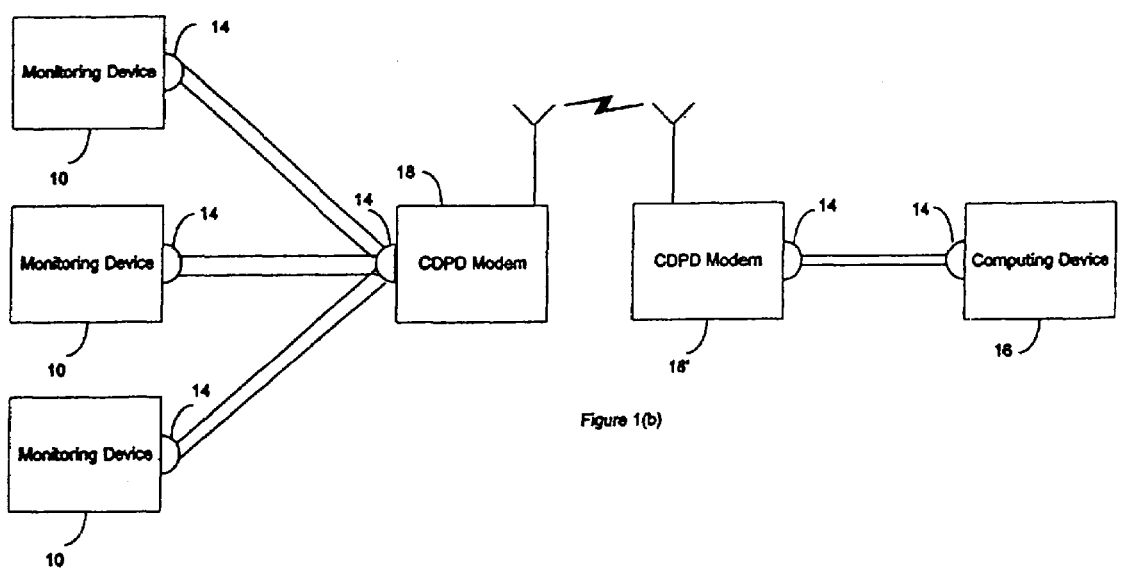
FIG. 1(b) is a schematic illustration of a system employing the wireless data transmission of the present invention.

FIG. 1(b) illustrates a data transmission system utilizing the present invention. Data is retrieved from remote monitoring devices 10 and transmitted to a CDPD modem 18 via RS232 interfaces 14. CDPD modem 18 transmits the information-via cellular radio to a second CDPD modem 18' which, in turn, transmits the information via RS232 interfaces 14 to computing device 16. As noted above, the computing device may be a programmable logical controller, a process control computer or data concentrator/multiplexer for storing, processing and or displaying the information.

Figures 2, 3:
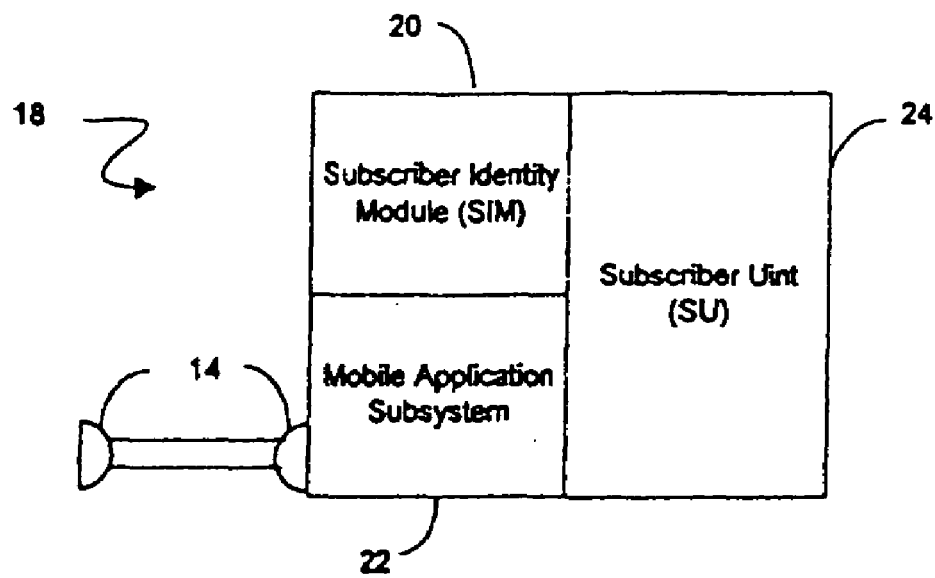
FIG. 2 is an illustration of components of a CDPD. utilized in the practice of the present invention.
FIG. 3 is a tabular illustration of the configuration of the configuration of two of the lines of the serial data transmission device of the present invention.

Referring now to FIG. 2, three components of the CDPD modem 18 are schematically illustrated. The CDPD modem 18 includes a Subscriber Identity Module ("SIM") 20, a Mobile Application Subsystem ("MAS") 22 and a Subscriber Unit ("SU") 24. The mobile application substation 22 interfaces with the end user application and the subscriber unit 24 manages the air interface. In some applications, the SIM is a "smart" card that is inserted or installed in a cellular phone that contains all subscriber-related information. The SIM facilitates communications from a valid cellular telephone because the subscriber data is used to complete telephone communications rather than the internal serial number of the telephone. In one embodiment, the present invention provides an enhancement to the SIM with a standard RS232 interface that increases the distance that digital data can reliably and accurately be transmitted via cellular communications and supports multiple standards without modification.

FIG. 3 is a tabular illustration of the configuration of two of the RS232 interface lines or pins utilized to implement data transmission in accordance with the present invention. In order to initiate data communications, the initiating application sets a "HIGH" signal on a first line 26. The program in the modem on the initiation side of the transmission decodes the signal and sets the status of the of the line in the line entry of the table to "SEND" and the value of the line to "HIGH." The entire table 26 is transmitted by the modem 18 on the initiating side as one packet of data. When the receiving modem receives the packet, it changes the status of the entry for the first line in the table to "ESTABLISHED" on the RS232 interface. The receiving application must then acknowledge the signal by setting the second line 28 high in the same sequence, i.e., set the status an transmit the table as one packet to the receiving modem. The initiating application then sets the status to "ESTABLISHED" on the RS232 interface. When both lines are seen as "HIGH" and "ESTABLISHED" by the initiating application, the initiating modem starts data transmission.

The data to be transmitted is concatenated to a signaling packet on the initiating side and the packet is transmitted. Since both lines are "HIGH" and "ESTABLISHED," the receiving modem accepts the data. A Cyclical Redundancy Check ("CRC") is used by the receiving modem to confirm the validity of the data. If the data passes the CRC check, it is accepted as valid. Since the wireless modems 18 and 18' provide wireless error correction, duplication of this function is not required. Incorporation of the CRC, however, makes error checking consistent between a wired and wireless application. Through the combination of a minimal logic set and a minimal set of signaling data as set forth above the present invention provides transparency of the wireless link to the application, the same reliability as a wired link for the application and a minimal program size that is important for such applications.

Figure 4:
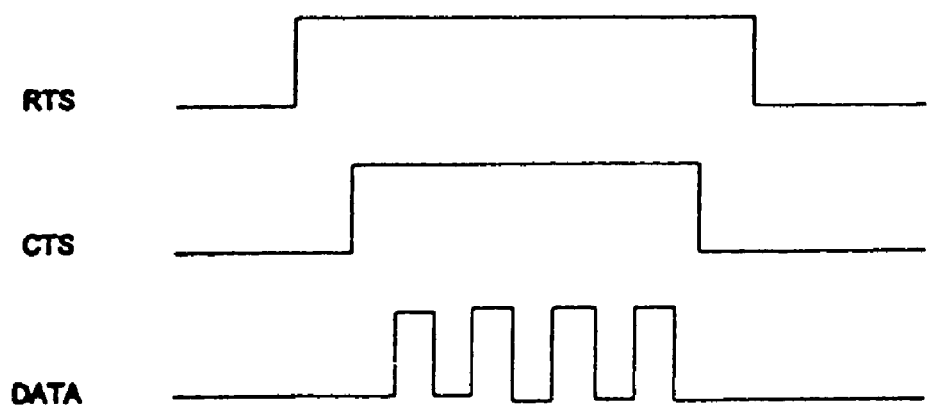
FIG. 4 is an illustration of the timing of the sequence of steps in data transmission utilizing the present invention.

Referring now to FIG. 4 the timing of the sequence of steps in data transmission utilizing the present invention is schematically illustrated. First, the RTS line is pulled "high" on the RS232 interface on the initiating side. Next, the CTS line on the RS232 interface is pulled "HIGH" after receipt of the table 26. After the table 26 has been transmitted back to the initiating modem 18 as described above, data transmission commences. Upon successful completion of data transmission, i.e., when the receiving application detects the end of text in the data, it sets the signal "LOW" on the CTS line, and initiates the same sequence of signaling to de-establish the lines.

Figure 5A:
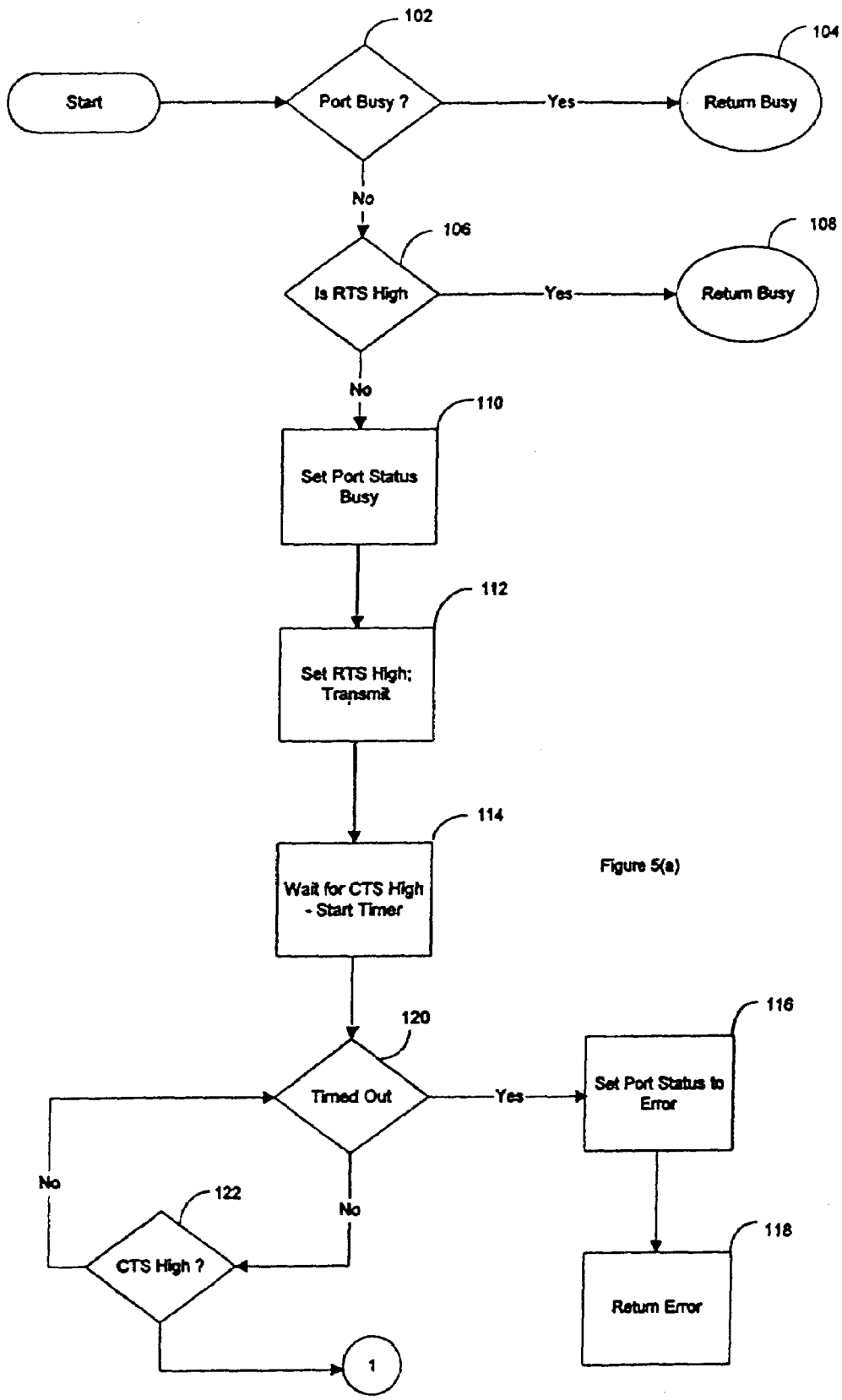
FIGS. 5(a) and 5(b) are a flowchart for the transmitting applications driver utilized in the practice of the present invention.
Figure 5B:
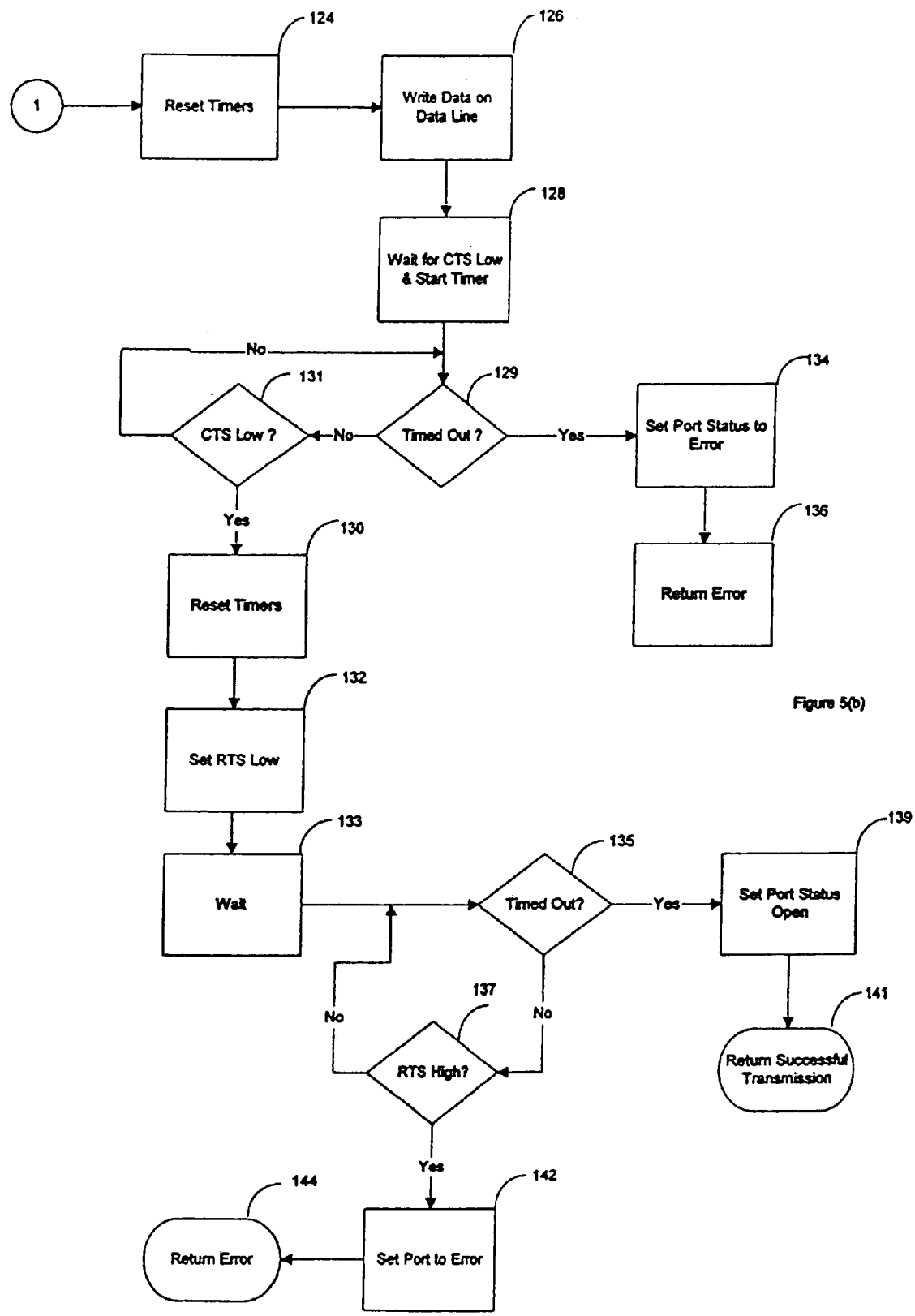

FIGS. 5(a) and 5(b) are a flowchart for the applications driver for the initiating modem. As illustrated, when the application is stated the first step is to check the status of the RS232 interface (step 102). If the port is busy, a busy signal is returned to the application (step 104). If the port is not busy, the application checks to determine whether the RTS line is high (step 106). If the RTS line is set high, a busy signal is returned to the application (step 108). If the RTS line is not set high, the port status is set busy (step 110) and the RTS line is set high and table 30 is transmitted as described above (step 112). A timer is initiated (step 114). If the timer times out before receipt of the table 26 from the receiving application, the port status is set to "ERROR" and the error status is returned to the application (steps 116 and 118). If the table 26 is received by the initiating application with the CTS line set high, the timers are reset (step 124) and data transmission is initiated.

When the receiving application detects the end of text in the data transmission it initiates a timer (step 128). If the application receives a CTS "LOW" before the timer times out, the timers are reset (step 130) and the RTS line is set low (step 132). If the timer times out before the CTS "LOW" is received, the port status is set to "ERROR" (step 134) and the error status is returned to the initiating application (step 136). Assuming that the RTS "LOW" signal is confirmed by the initiating device before the timer is timed out, the port status is set open (step 138) and a signal indicating successful transmission is transmitted to the initiating application (step 140). If the RTS low is not confirmed prior to the timer timing out, the port status is set to "ERROR" (step 142) and the error status is transmitted to the initiating application (step 144).

Figure 6A:
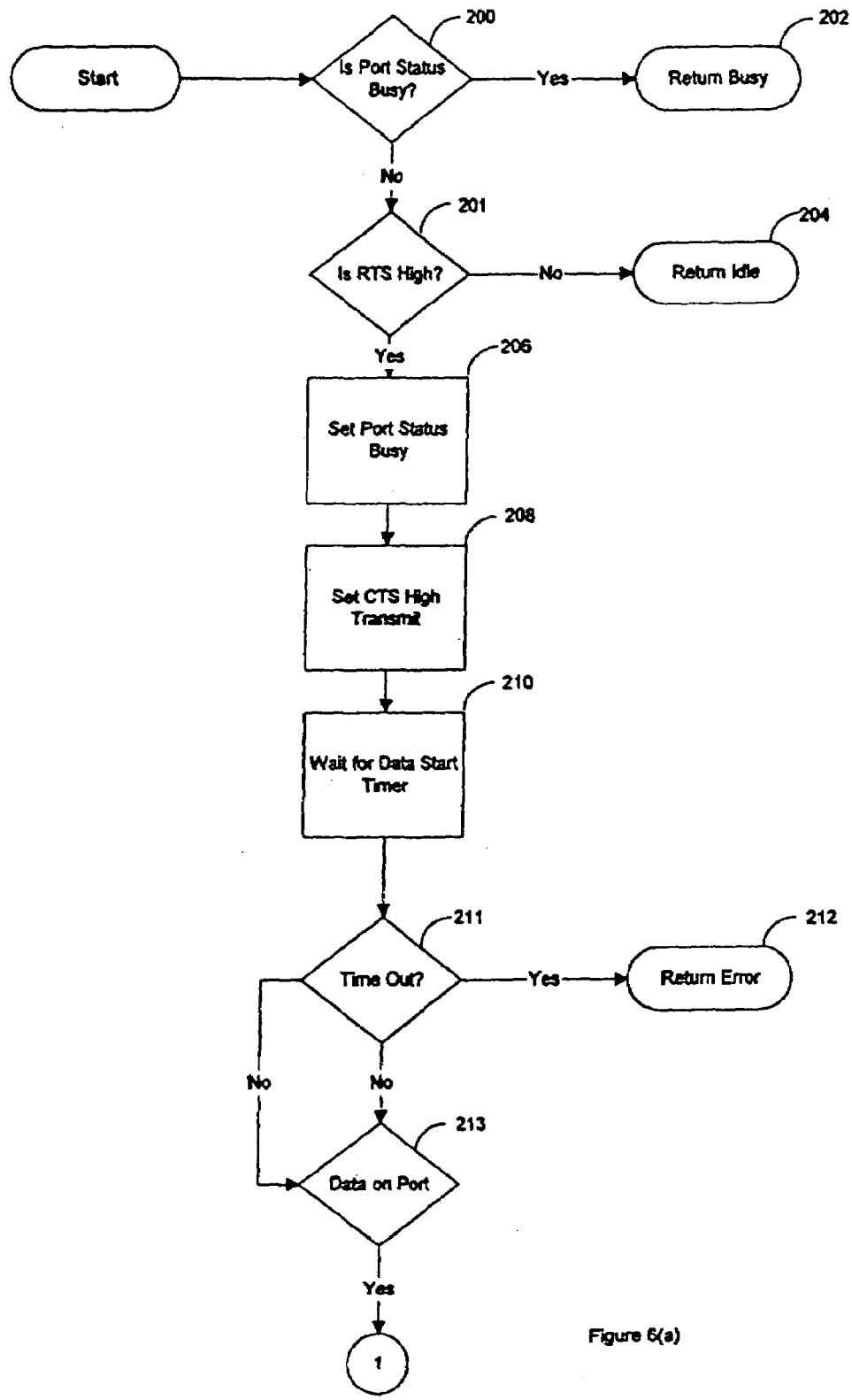
FIGS. 6(a) and 6(b) are a flowchart for the receiving applications driver utilized in the practice of the present invention.
Figure 6B:
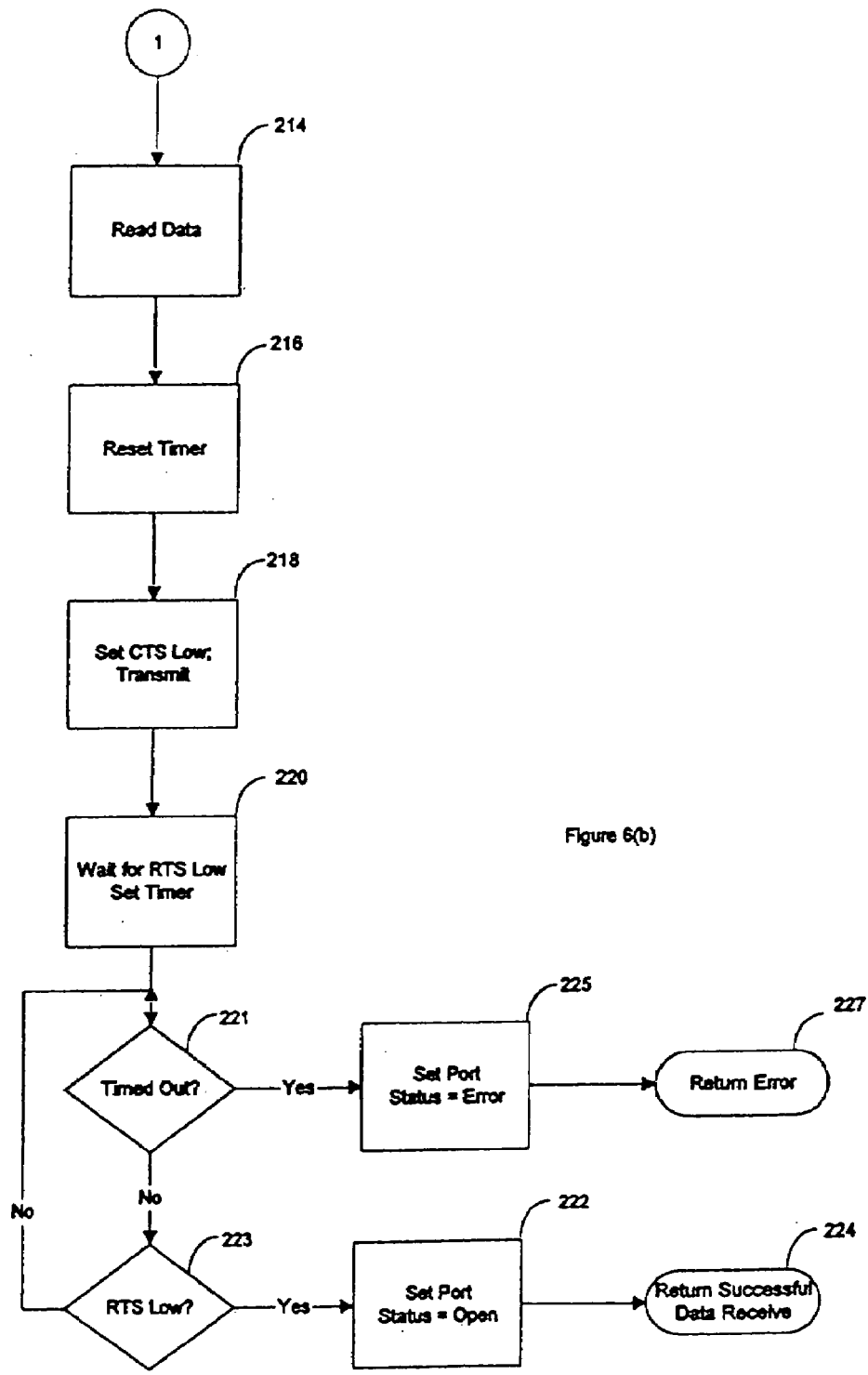
Figure 7A:
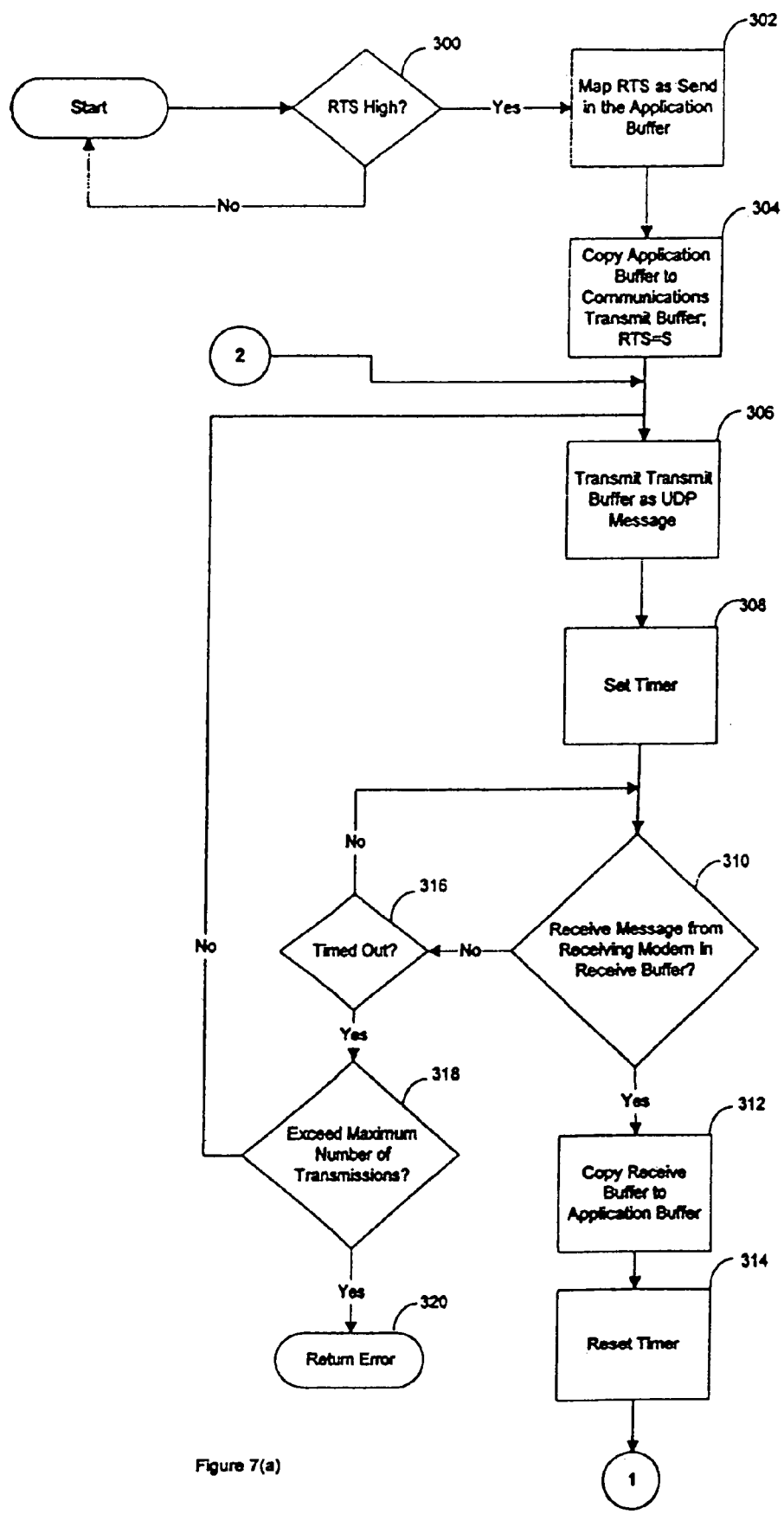
FIGS. 7(a) through 7(e) are a flow chart for control of the initiating CDPD modem as utilized in the practice of the present invention.
Figure 7B:
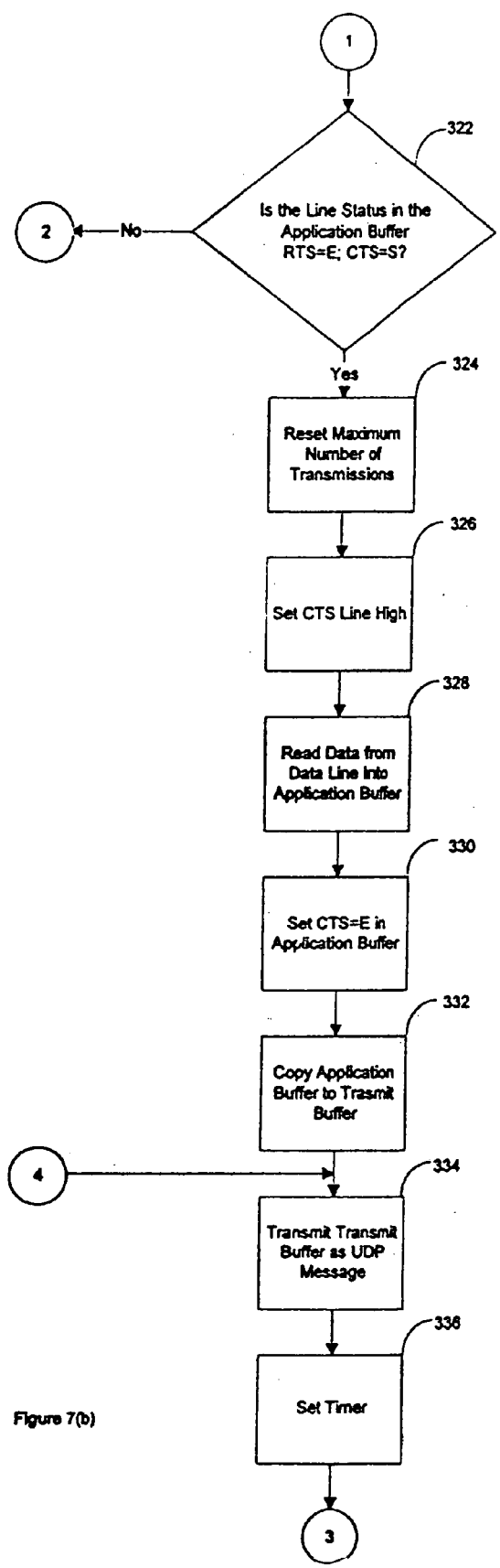
Figure 7C:
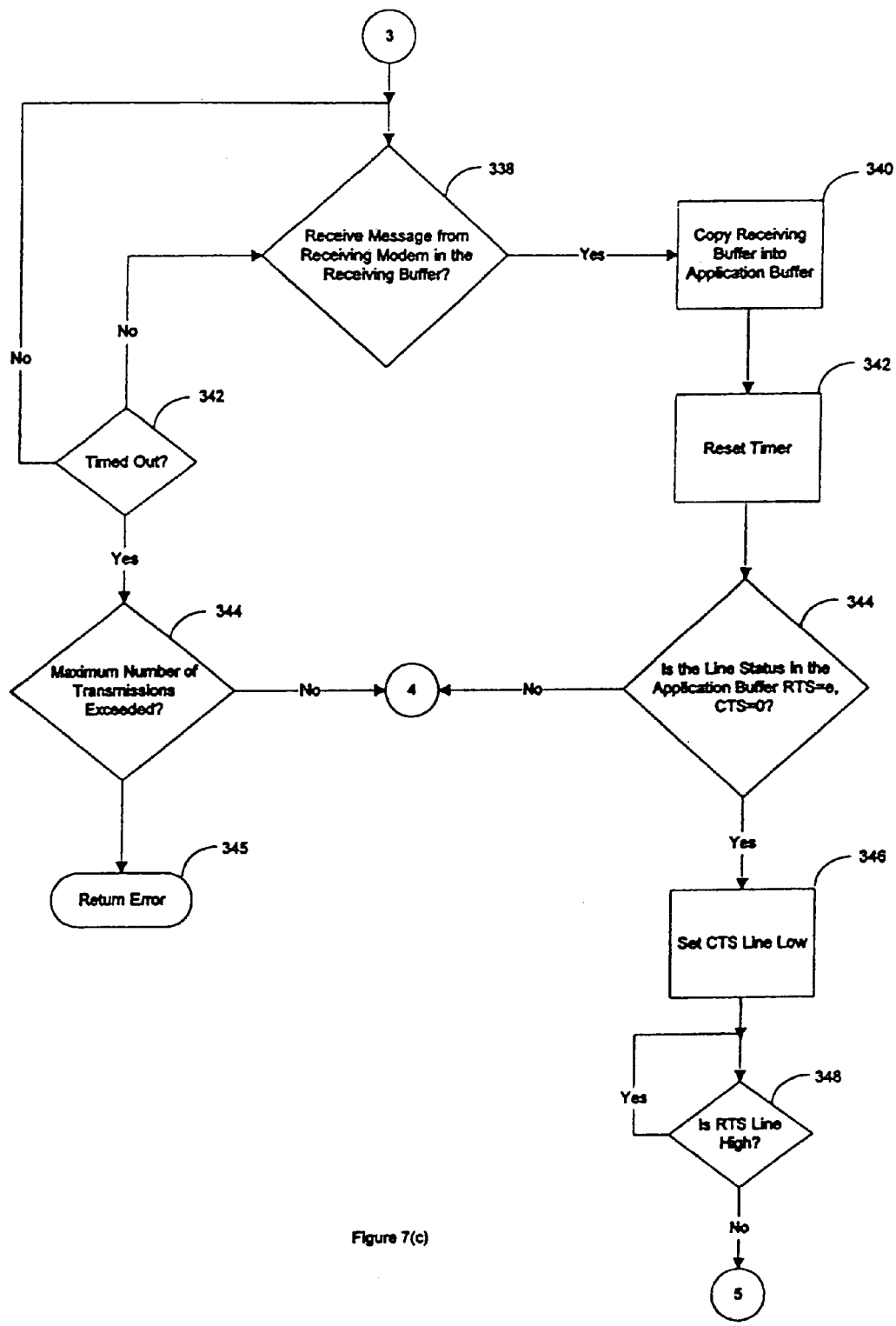
Figure 7D:
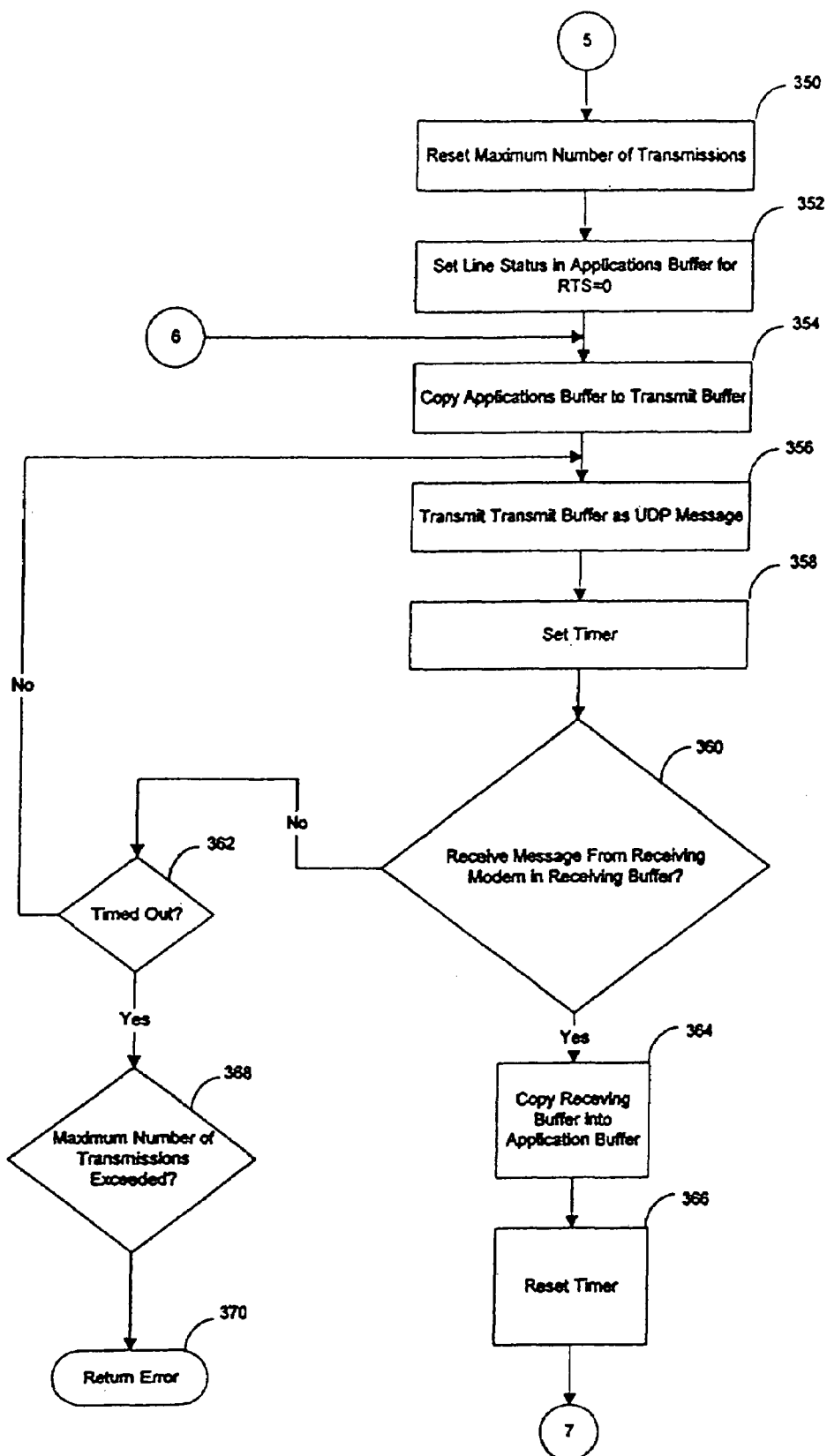
Figure 7E:
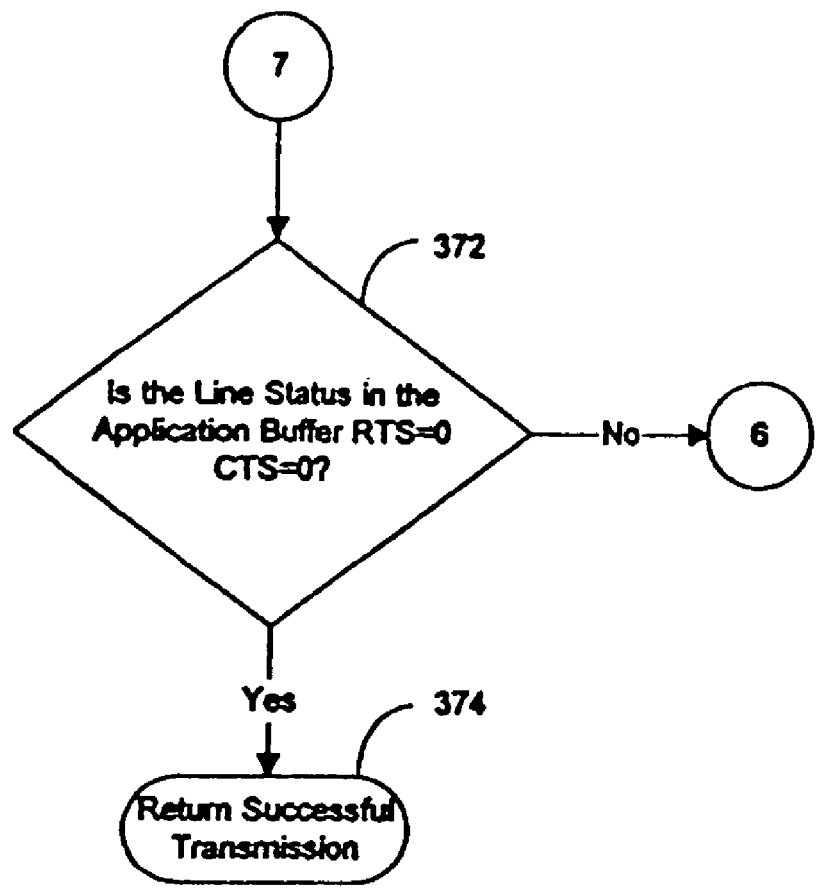
Figure 8A:
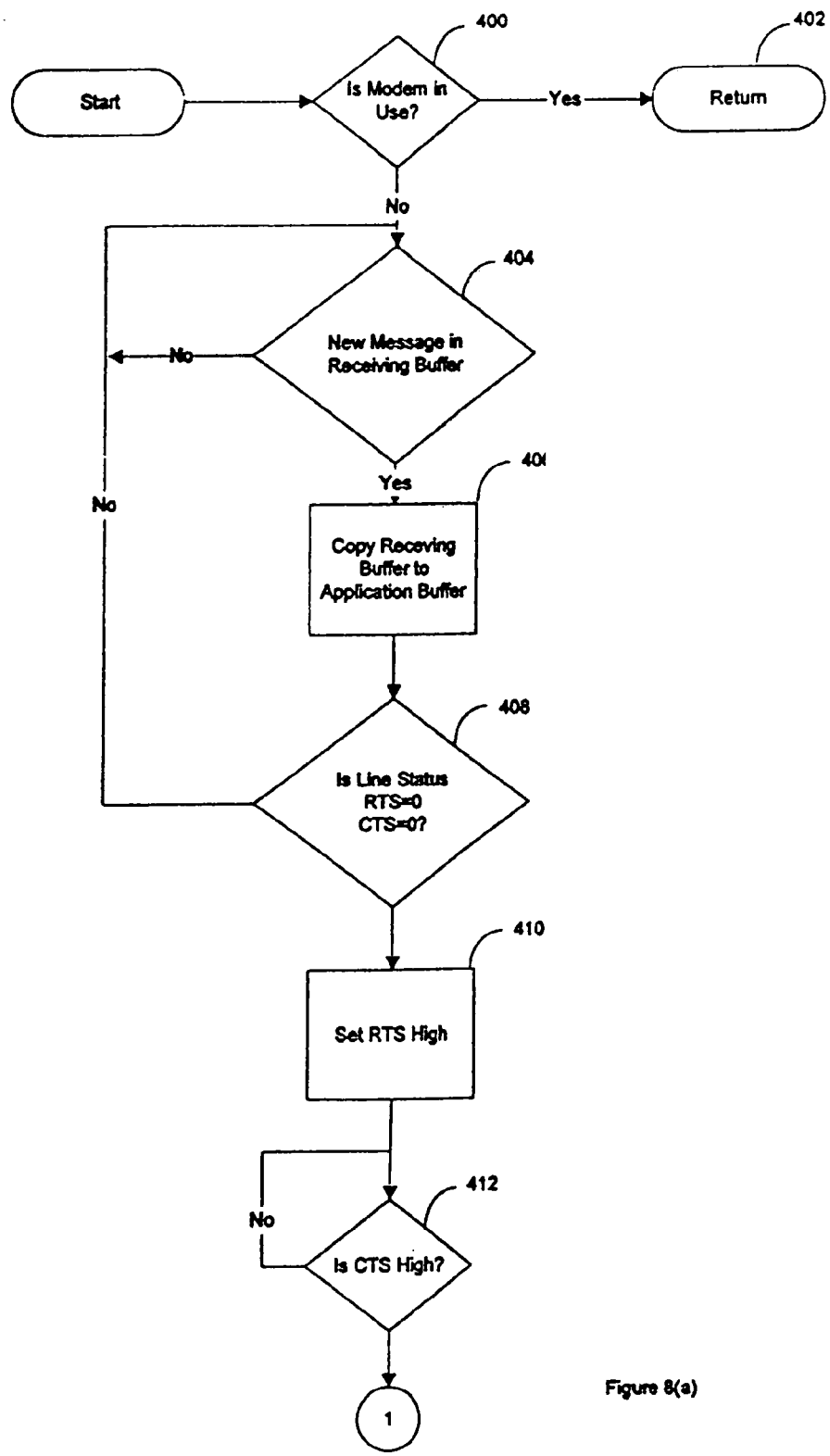
FIGS. 8(a) through 8(d) are a flow chart for control of the receiving CDPD modem as utilized in the practice of the present invention.
Figure 8B:
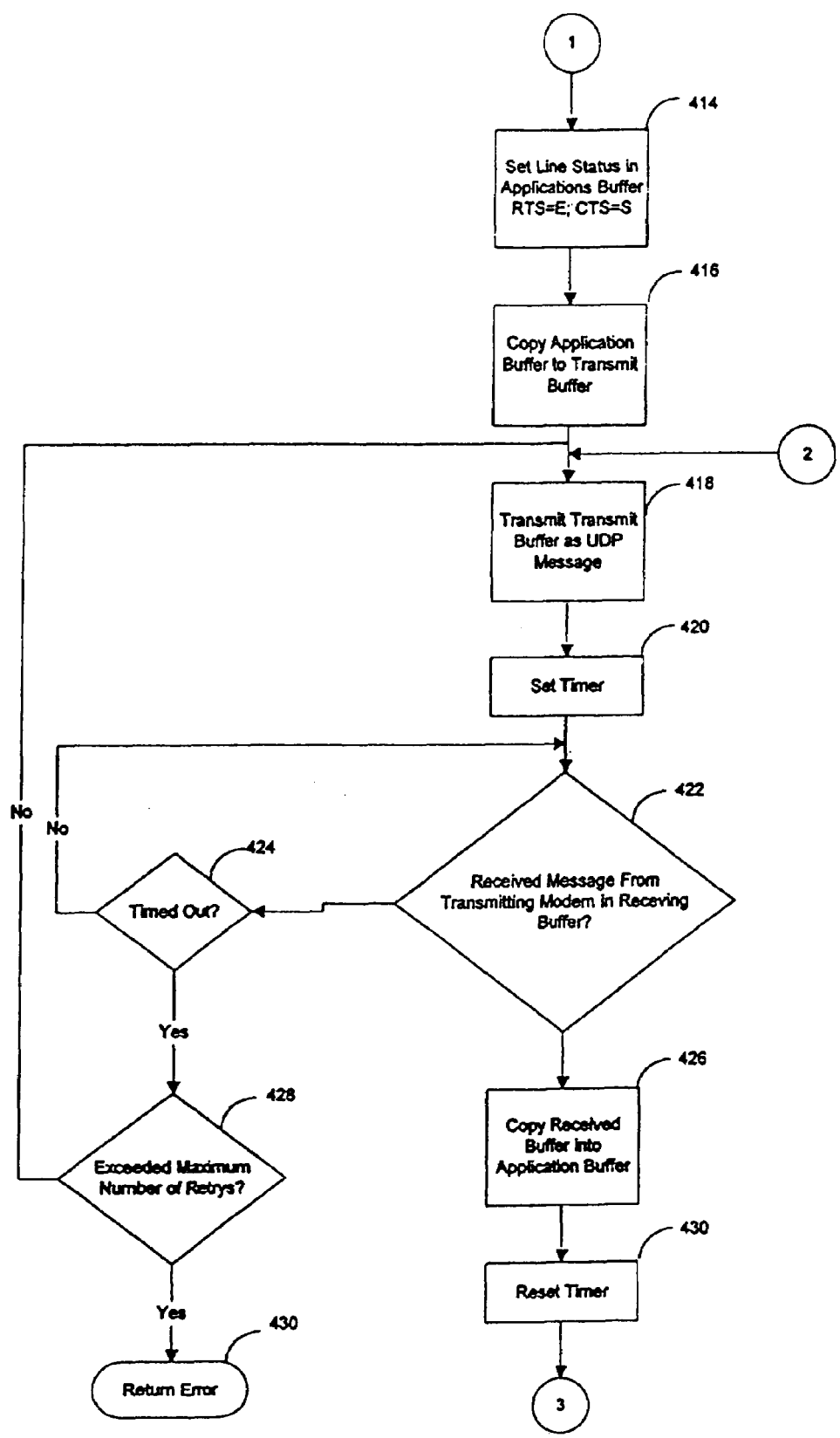
Figure 8C:
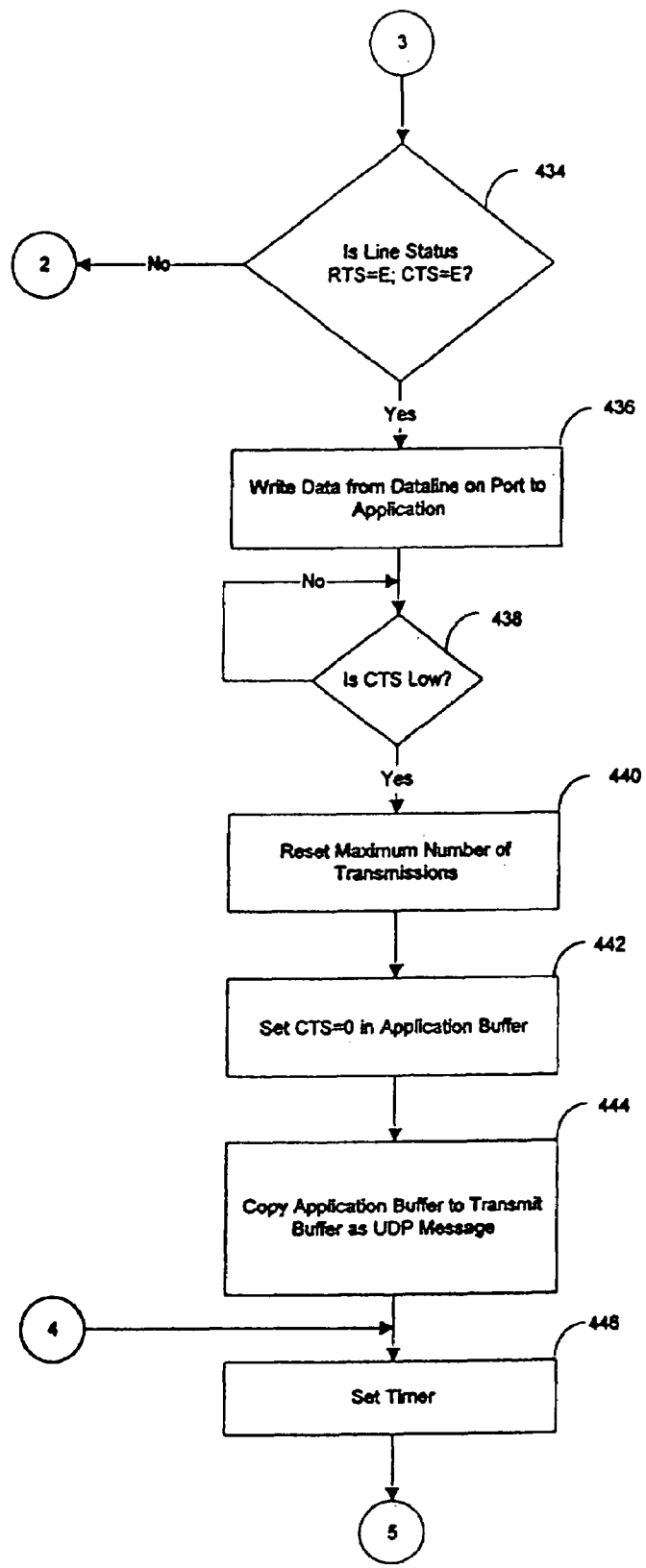
Figure 8D:
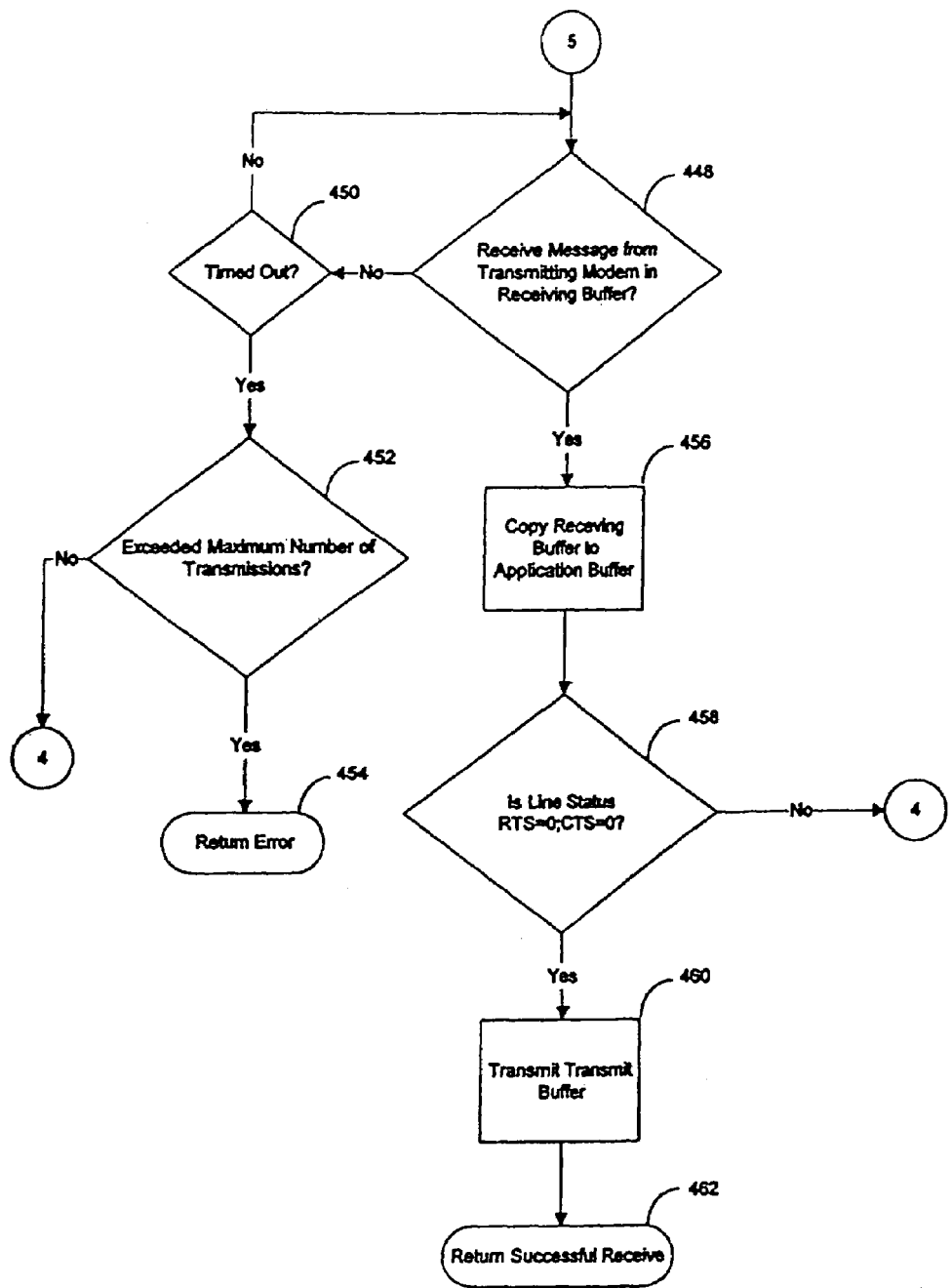

Referring now to FIGS. 6(a) and 6(b) a flowchart for the applications driver for the receiving application is illustrated. After the application is started, the status of the port is checked (step 200) and if the port is busy a return busy signal is returned to the application (step 202). If the RTS line is set low, a return "IDLE" signal is returned to the application (step 204) If the RTS line is set "HIGH" the port status is set "BUSY" (step 206), the CTS line is set high (step 208), and table 26 is transmitted to the initiating application. A timer is initiated (step 210) and if a data transmission is detected on the port before the timer times out, the data is read (step 214) and the timer reset (step 216). If no data transmission is detected on the port before the timer times out, an error signal is returned to the application (step 212).

After the receiving application detect the end of text in the data, it sets the signal in the CTS line "LOW", transmits the data in table 26 (step 218) as described above to the initiating application and sets a timer (step 220). If the receiving application receives confirmation that the RTS line is set low prior to timing out, the port status is set as "OPEN" (step 222) and a successful data receive signal is returned to the initiating application (step 224). If confirmation is not received, and if the timer has timed out, the port status is set to "ERROR" (step 226) and a return error signal is transmitted to the initiating application (step 228).

Referring now to FIGS. 7(a) through 7(e) a flow chart for the CDPD. modem control for the initiating modem is illustrated. The status of the RTS line is checked (step 300), and if the RTS line is set high the status of the RTS line is mapped as "SEND" in the application buffer (step 302) and the application buffer is copied to the communications transmit buffer (step 304). The transmit buffer is then transmitted to the receiving modem as a UDP ("User Data Protocol") message, (step 306) and a timer is set (step 308). If a message is received from the receiving modem in the receive buffer (step 310), the receive buffer is copied to the application buffer (step 312) and the timer is reset (step 314). If the timer times out prior to the receipt of a message from the receiving modem (step 316) the number of attempted transmissions is compared to a predetermined maximum number of transmissions (step 318). If the number of attempted transmissions exceeds the predetermined maximum an error message is returned to the application (step 320).

After the receive buffer is copied to the application buffer, the status of the RTS and CTS lines in the application buffer is checked (step 322). If the RTS line status is set to "ESTABLISHED" and the CTS line status is set to "SEND", the predetermined number of permissible transmission attempts is reset (step 324) and the CTS line is set "HIGH" (step 326), otherwise control is returned to step 306. Upon receipt of data, the data is read from the data line into the application buffer (step 328) and the CTS line status is set as "ESTABLISHED" in the application buffer (step 330). The application buffer is copied to the transmit buffer (step 332), transmitted as a UDP message (step 334) and a timer is set (step 336).

If a message is received from the receiving modem in the receiving buffer (step 338), before the timer times out, the contents of the receiving buffer are copied into the applications buffer (step 340). If the timer times out prior to the receipt of a message from the receiving modem (step 342), the number of attempted transmissions are compared to a predetermined maximum number of transmissions (step 344). If the number of attempted transmissions exceeds the predetermined maximum, an error message is returned to the application, otherwise control is returned to step 334. After the contents of the receiving buffer is copied into the applications buffer (step 340), the timer is reset and the line status in the application buffer is checked for RTS "ESTABLISHED" and CTS "LOW" (step 344). If these conditions are met, the CTS line is set "LOW" (step 346). If the line status in the application buffer for RTS is not "ESTABLISHED" or if CTS is not set "LOW", control is returned to step 334.

After the CTS line is set "LOW" in step 346, the RTS line is checked for a "HIGH" condition (step 348) and the maximum number of permissible attempted number of attempted transmissions is reset (step 350). If the RTS is "LOW," control is returned to step 348. After the number of permissible attempted transmissions is reset in step 350, the line status for RTS in the applications buffer is set "LOW" (step 352). The applications buffer is copied to the transmit buffer (step 354), the transmit buffer is transmitted as a UDP message (step 356) and a timer is set (step 358). If a message is received from the receiving modem in the receiving buffer (step 360) prior to the timer timing out (step 362), the contents of the receiving buffer are copied into the application buffer (step 364) and the timer is reset (step 366). If the timer times out (step 362) the number of attempted transmissions is compared to the maximum permissible number (step 368). If the number of attempted transmissions exceeds the maximum permissible number, an error message is returned to the application, (step 370); if not, control is returned to step 356.

After the timer is reset in step 366, the line status in the applications buffer is checked for RTS "LOW" and CTS "LOW" (step 372). If these conditions are not met, control is returned to step 354, if the conditions are met, a signal indicating a successful transmission is returned to the application (step 374).

Referring now to FIGS. 8(a) through 8(d), the modem control for the receiving modem is schematically illustrated. The receiving modem checks to determine whether the modem is in use (step 400) and if so, signals a return (step 402). If the modem is not in use, the application checks for a new message in the receive buffer (step 404). If a message is present in the receive buffer, the contents of the receive buffer are copied (step 406) to the applications buffer and the line status is checked for RTS "SEND" and CTS "LOW" (step 408). If these conditions are met, the RTS line is set "HIGH" (step 410) and the status of the CTS line is checked for a "high" status (step 412).

If the line status of the CTS is high, the line status in the applications buffer is set as RTS "established" and CTS "send" (step 414). The contents of the application buffer are copied to the transmit buffer (step 416) and transmitted to the initiating modem (step 418) as a UDP message. A timer is set (step 420) and the receive buffer is checked for receipt of a message from the transmitting modem (step 422). If a message is received from the transmitting modem before the timer times out (step 424), the message is copied from the receive buffer into the applications buffer (step 426). At this time, the timer has timed out and the number of attempted transmission has exceeded the predetermined maximum number of allowable attempted transmissions, (step 428), a error signal is returned to the application (step 430). If the timer has not timed out, control is returned to step 422, or if the timer has timed out and the predetermined maximum number of attempted transmissions has not been exceeded, control is returned to step 418.

After the contents of the receiving buffer have been copied into the applications buffer in step 426, the timer is reset (step 432) and the line status is checked for RTS "established" and CTS "established" (step 434). Data from the dataline is written to from the dataline on the port to the application (step 436). The status of the CTS is check for "low" (step 438) and if this condition is met, the predetermined allowable number of attempted transmissions is reset, (step 440) and the CTS status is set to "low" in the applications buffer, and the contents of the applications buffer is copied to the transmit buffer for transmission as a UDP message (step 444), a timer is set (step 446) and the receive buffer is monitored for receipt of a message from the transmitting modem (step 448). If the timer times out prior to receipt of a message from the transmitting modem, (step 450) the number of attempted transmissions is compared to the predetermined allowable number of attempted transmissions (step 452) and if the maximum allowable number of attempted transmissions is exceeded, an error signal is returned to the application (step 454).

After a message has been received from the transmitting modem, (step 448), a copy of the received buffer is copied to the application buffer, (step 456) and the line status is checked for CTS "low" and RTS "low" (step 458). If these conditions are met, the contents of the transmit buffer are transmitted (step 460) and a "successful receive" message is returned to the application. If the line status conditions are not met, control is returned to step 446.

Through the combination of a minimal logic set and minimal signaling data as set forth above, the present invention provides a transparent wireless link between RS232 interfaces with the same or equivalent reliability as a hard wired link. Further, the present invention provides these features with a minimal program size, a feature that is important in the applications of interest.

Figure 9A:
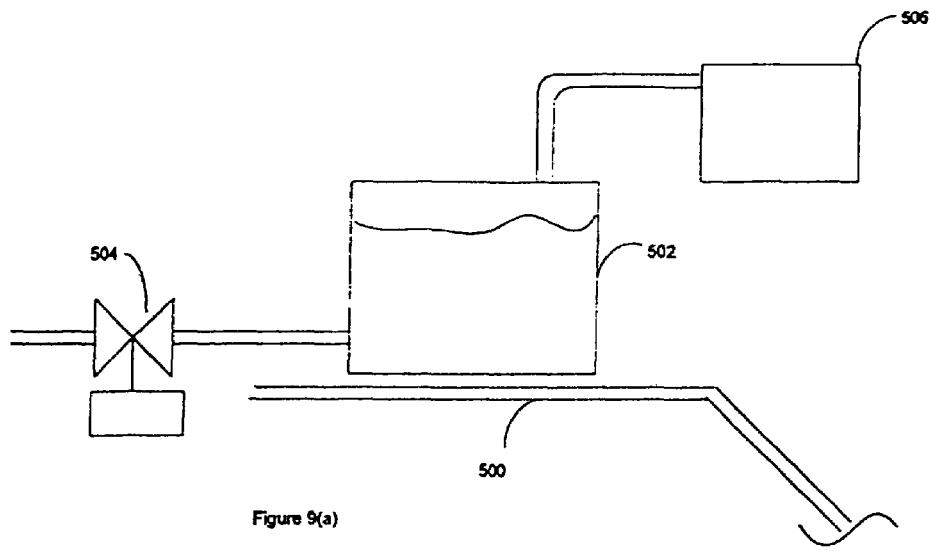
FIGS. 9(a) and 9(b) are a schematic representation of one embodiment of the system of the present invention.
Figure 9B:
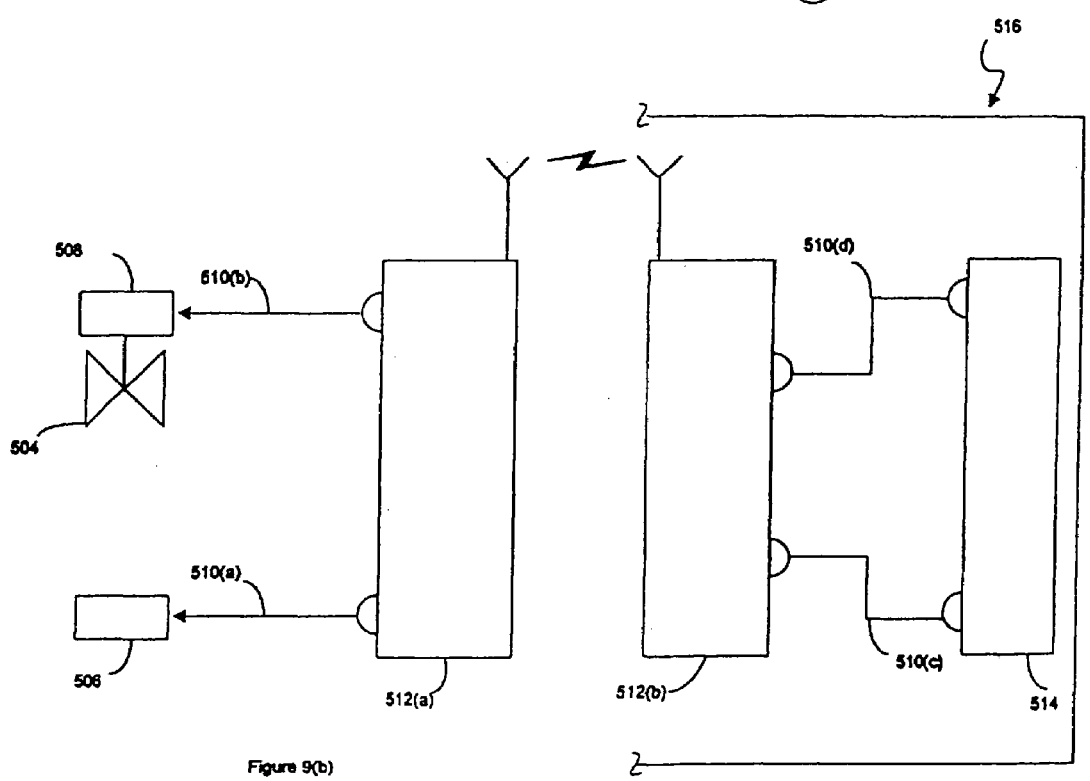

Turning now to FIGS. 9(a) and 9(b) the invention is illustrated in the context of controlling the operation of a control valve on an offshore drilling platform. Offshore drilling platforms are, in some cases, remotely operated and controlled for several months at a time. In such cases the control functions may be performed using the wireless data interface of the present invention. Resident on the platform 500 is a process vessel 502 such as a pumping tank or separator. Liquid hydrocarbons enter the process vessel 502 through control valve 504. The vessel 502 is equipped with a level control sensor 506. In accordance with one embodiment of the present invention, the level of fluid in vessel 502 is monitored from a remote control center which, in turn, controls the operation of valve 504 via wireless telecommunications. Preferred characteristics of the wireless communication and control system in such an application include: (1) response time of less than two seconds, more preferably less than one second; (2) transfer of information packets of from one to sixteen bytes with a high degree of accuracy; (3) immediate identification of error conditions in each information transmission; and (4) adaptability of the system to existing hardware and equipment.

By way of illustration, level control sensor 506 measures the level in vessel 502. At preprogramed one second intervals the output from the level control sensor 506 is transmitted to CDPD modem 512(a) via RS232 cable 510(a). CDPD modem 512 transmits the signal from the level control sensor 506 to a central control station 516 where it is received by CDPD modem 512(b). The signal is then transmitted to programmable controller 514 which, in turn, responds with a control signal transmitted to CDPD modem 512(b) through RS232 cable 510(d). The control signal is transmitted by CDPD modem 512(b) to modem 512(a) which communicates the signal to controller 508 which, in turn, adjusts the position of control valve 504.

As illustrated, the CDPD modems 512(a) and 512(b) each have two serial ports, corresponding to the monitored variable, in this case the fluid level in vessel 502, and the control function performed by programmable controller 514. In accordance with the present invention, the packet format utilized to transmit the measured variable and control signals is augmented with a port number. Each information packet is input into a buffer dedicated to the particular port. When modem 512(a) or 5132(b) is available for transmission, information packets stored in the buffers associated with the respective ports are combined and transmitted. The receiving modem directs the packets to the designated port as indicated by the port number incorporated into the packet. The addition of the port identification to the information packet allows modems 512(a) and 512(b) to each support two ports, thus eliminating the need for multiple modems at the platform 500 and central control station 516. It will be appreciated by those skilled in the art that the system described in the above example can be readily expanded to accommodate measurement and control of numerous process parameters and functions through the use of multiple RS232 ports connected to one CDPD modem located at the remote site and a second CDPD modem located at a central control center. Since the system of the present invention is capable of supporting numerous applications, overhead is shared among the various monitoring and control devices resulting in a substantial gain in efficiency.

While the present invention has been disclosed and discussed in connection with the above-described embodiment, it will be apparent to those skilled in the art that numerous changes, variations and modifications within the spirit and scope of the invention are possible. Thus, while the invention has been described in the context of transmitting information from remote instrumentation to a central processing center or computing device, the invention will be advantageously used in other applications where point-to-point communications between remote devices utilizing digital serial data interfaces to transmit and receive information. Accordingly, it is therefore, intended that following claims shall encompass such variations and modifications.

The invention claimed is:

1. A method for providing wireless monitoring, the method comprising:
    receiving a control signal specifying a value on a line from a monitoring device according to a physical layer signaling protocol to initiate communication with a computing device;
    setting status of the line in response to the control signal;
    changing the status of the line to establish communication with the computing device upon receiving acknowledgement from the computing device;
    receiving data from a monitoring device according to the physical layer signaling protocol; and
    transmitting the data to the computing device according to the physical layer signaling protocol over a wireless point-to-point link using a cellular protocol.

2. A method according to claim 1, wherein the cellular protocol includes a Cellular Digital Packet Data (CDPD) protocol.

3. A method according to claim 1, wherein the physical layer signaling protocol includes RS-232, the monitoring device and the computing device being configured as Data Terminal Equipment (DTE).

4. A method according to claim 1, wherein the wireless link is transparent to an application that resides on the computing device and utilizes the physical layer signaling protocol.

5. A method according to claim 1, wherein the monitoring device in the receiving step includes at least one of a flow measurement device, a temperature measurement device, and a pressure measurement device.

6. An apparatus for providing wireless monitoring, comprising:
    a first interface configured to receive a control signal specifying a value on a line from a monitoring device according to a physical layer signaling protocol to initiate communication with a computing device, wherein status of the line is set in response to the control signal, the status being changed to establish communication with the computing device upon receiving acknowledgement from the computing device; and
    a second interface configured to transmit data from the monitoring device to a computing device according to the physical layer signaling protocol over a wireless point-to-point link using a cellular protocol, wherein the wireless link is transparent to an application that resides on the computing device and utilizes the physical layer signaling protocol.

7. An apparatus according to claim 6, wherein the cellular protocol includes a Cellular Digital Packet Data (CDPD) protocol.

8. An apparatus according to claim 6, wherein the physical layer signaling protocol includes RS-232, the monitoring device and the computing device being configured as Data Terminal Equipment (DTE).

9. An apparatus according to claim 8, the wireless link is transparent to an application that resides on the computing device and utilizes the physical layer signaling protocol.

10. An apparatus according to claim 6, wherein the monitoring device includes at least one of a flow measurement device, a temperature measurement device, and a pressure measurement device.

11. A method for providing wireless monitoring, the method comprising:
    receiving a packet from a monitoring device to initiate communication with a computing device, the packet indicating a status of a first line;
    changing the status of the first line;
    receiving acknowledgement to establish the communication upon the computing device setting a second line;
    receiving data from the monitoring device according to a physical layer signaling protocol over a wireless point-to-point link using a cellular protocol; and
    transmitting the data to a computing device according to the physical layer signaling protocol.

12. A method according to claim 11, wherein the cellular protocol includes a Cellular Digital Packet Data (CDPD) protocol.

13. A method according to claim 11, wherein the physical layer signaling protocol includes RS-232, the monitoring device and the computing device being configured as Data Terminal Equipment (DTE).

14. A method according to claim 13, wherein the wireless link is transparent to an application that resides on the computing device and utilizes the physical layer signaling protocol.

15. A method according to claim 11, wherein the monitoring device in the receiving step includes at least one of a flow measurement device, a temperature measurement device, and a pressure measurement device.

16. An apparatus for providing wireless monitoring, comprising:
    a first interface configured to receive a control signal from a monitoring device to initiate communication with a computing device according to a physical layer signaling protocol over a wireless point-to-point link using a cellular protocol, the control signal indicating a status of a first line;
    logic configured to change the status of the first line; and
    a second interface configured to receive an acknowledgement to establish the communication with the computing device upon the computing device setting a second line.

17. An apparatus according to claim 16, wherein the cellular protocol includes a Cellular Digital Packet Data (CDPD) protocol.

18. An apparatus according to claim 16, wherein the physical layer signaling protocol includes RS-232, the monitoring device and the computing device being configured as Data Terminal Equipment (DTE).

19. An apparatus according to claim 18, wherein the wireless link is transparent to an application that resides on the computing device and utilizes the physical layer signaling protocol.

20. An apparatus according to claim 16, wherein the monitoring device includes at least one of a flow measurement device, a temperature measurement device, and a pressure measurement device.

21. A method for providing wireless monitoring, the method comprising:
 generating data by an application based upon measurements, the application complying with a physical layer signaling protocol; and
 transmitting the data according to the physical layer signaling protocol to a modem, wherein the cellular modem transmits the data to a computing device according to the physical layer signaling protocol over a wireless point-to-point link using a cellular protocol, wherein the wireless link is transparent to the application and to a receiving application that resides on the computing device and utilizes the physical layer signaling protocol.

22. A method according to claim 21, wherein the cellular protocol includes a Cellular Digital Packet Data (CDPD) protocol.

23. A method according to claim 21, wherein the physical layer signaling protocol includes RS-232, the computing device being configured as Data Terminal Equipment (DTE).

24. A method according to claim 23, further comprising:
 sending a control signal specifying a value on a line to the modem to initiate communication with the computing device, wherein the modem sets status of the line to a first state and changes the status of the line to a second state upon receiving acknowledgement from the computing device.

25. A method according to claim 21, wherein the measurements in the generating step include at least one of flow measurements, temperature measurements, and pressure measurements.

26. An apparatus for providing wireless monitoring, comprising:
 memory storing an application for generating data based upon measurements, the application complying with a physical layer signaling protocol; and
 an interface configured to transmit the data according to the physical layer signaling protocol to a modem, wherein the cellular modem transmits the data to a computing device according to the physical layer signaling protocol over a wireless point-to-point link using a cellular protocol, wherein the wireless link is transparent to the application and to a receiving application that resides on the computing device and utilizes the physical layer signaling protocol.

27. An apparatus according to claim 26, wherein the cellular protocol includes a Cellular Digital Packet Data (CDPD) protocol.

28. An apparatus according to claim 26, wherein the physical layer signaling protocol includes RS-232, the computing device being configured as Data Terminal Equipment (DTE).

29. An apparatus according to claim 28, wherein the interface sends a control signal specifying a value on a line to the modem to initiate communication with the computing device, wherein the modem sets status of the line to a first state and changes the status of the line to a second state upon receiving acknowledgement from the computing device.

30. An apparatus according to claim 26, wherein the measurements include at least one of flow measurements, temperature measurements, and pressure measurements.

31. A method for providing wireless monitoring, the method comprising:
 receiving data generated according to a physical layer signaling protocol from a remote monitoring device via a local modem over a wireless point-to-point link using a cellular protocol, wherein the monitoring device utilizes the physical layer signaling protocol; and
 processing the data according to an application that utilizes the physical layer signaling protocol, wherein the wireless link is transparent to the application;
 receiving a packet from the monitoring device to initiate communication with the computing device, the packet indicating a status of a first line; and
 setting a second line to acknowledge establishment of the communication with the monitoring device.

32. A method according to claim 31, wherein the cellular protocol includes a Cellular Digital Packet Data (CDPD) protocol.

33. A method according to claim 31, wherein the physical layer signaling protocol includes RS-232, the monitoring device being configured as Data Terminal Equipment (DTE).

34. A method according to claim 31, wherein the monitoring device in the receiving step includes at least one of a flow measurement device, a temperature measurement device, and a pressure measurement device.

35. An apparatus for providing wireless monitoring, comprising:
 an interface configured to receive data generated according to a physical layer signaling protocol from a remote monitoring device via a local modem over a wireless point-to-point link using a cellular protocol, wherein the monitoring device utilizes the physical layer signaling protocol; and
 logic configured to process the data according to an application utilizes the physical layer signaling protocol, wherein the wireless link is transparent to the application.
 wherein the interface receives a packet from the monitoring device to initiate communication with the computing device, the packet indicating a status of a first line, and a second line is set to acknowledge establishment of the communication with the monitoring device.

36. An apparatus according to claim 35, wherein the cellular protocol includes a Cellular Digital Packet Data (CDPD) protocol.

37. An apparatus according to claim 35, wherein the physical layer signaling protocol includes RS-232, the monitoring device being configured as Data Terminal Equipment (DTE).

38. An apparatus according to claim 35, wherein the monitoring device includes at least one of a flow measurement device, a temperature measurement device, and a pressure measurement device.

* * * * *